(12) United States Patent
Gallaher

(10) Patent No.: US 8,430,088 B1
(45) Date of Patent: Apr. 30, 2013

(54) ROTATING GRILL TOP ACCESSORY

(76) Inventor: Richard Gallaher, York, SC (US)

( * ) Notice: Subject to any disclaimer, the term of this patent is extended or adjusted under 35 U.S.C. 154(b) by 328 days.

(21) Appl. No.: 12/888,788

(22) Filed: Sep. 23, 2010

(51) Int. Cl.
*A47J 37/04* (2006.01)

(52) U.S. Cl.
USPC ............... 126/25 AA; 126/25 R; 126/152 B; 126/150; 126/338; 211/131.1; 211/144; 248/349.1

(58) Field of Classification Search ............ 126/150, 126/152 B, 182, 338, 41 A, 25 AA, 25 R; 211/1.52, 110, 126.2, 131.1, 133.4, 144, 211/163, 181.1, 70, 78, 85.31, 85.4, 95; 248/349.1
See application file for complete search history.

(56) References Cited

U.S. PATENT DOCUMENTS

| | | | | |
|---|---|---|---|---|
| 1,530,226 | A * | 3/1925 | Bitney | 126/338 |
| 2,070,055 | A * | 2/1937 | Levien | 211/77 |
| 2,189,240 | A * | 2/1940 | Burr | 126/338 |
| 3,025,116 | A * | 3/1962 | McMahan, Jr. | 384/608 |
| 3,033,190 | A | 5/1962 | Atkinson | |
| 3,417,873 | A * | 12/1968 | Leptrone | 211/77 |
| 3,512,515 | A | 5/1970 | McGee | |
| 3,657,996 | A | 4/1972 | Thompson | |
| 3,688,758 | A * | 9/1972 | Stephen et al. | 126/41 R |
| 4,129,111 | A | 12/1978 | Lehtovaara | |
| 4,287,818 | A * | 9/1981 | Moore et al. | 99/355 |
| 4,630,593 | A * | 12/1986 | Gremillion | 126/25 R |
| 4,724,753 | A | 2/1988 | Neyman | |
| 5,331,942 | A * | 7/1994 | McDonald et al. | 126/25 R |
| 5,787,873 | A | 8/1998 | Whitehouse | |
| 5,819,718 | A * | 10/1998 | Leiser | 126/30 |
| 5,964,212 | A * | 10/1999 | Thompson | 126/25 R |
| 6,029,565 | A | 2/2000 | Plymale | |
| 6,929,001 | B2 | 8/2005 | Yoon | |
| 7,063,006 | B1 | 6/2006 | Spehle | |
| 7,823,577 | B1 * | 11/2010 | Babjak | 126/25 AA |
| D650,227 | S * | 12/2011 | Walker | D7/409 |
| 8,267,257 | B2 * | 9/2012 | Doyal | 211/1.52 |
| 2008/0217266 | A1 * | 9/2008 | Doyal | 211/1.52 |
| 2010/0269711 | A1 * | 10/2010 | Klein et al. | 99/357 |
| 2010/0276414 | A1 * | 11/2010 | Nam et al. | 219/392 |

FOREIGN PATENT DOCUMENTS

WO WO 2005047774 A1 * 5/2005

* cited by examiner

*Primary Examiner* — Kenneth Rinehart
*Assistant Examiner* — Jorge Pereiro
(74) *Attorney, Agent, or Firm* — Kyle Fletcher

(57) ABSTRACT

The rotating grill top accessory involves a circular grill grate that is rotatably mounted atop a base that is placed atop an existing grill grate of an existing grill. The circular grill grate has a lip along a periphery of said grill grate so as to prevent items from rolling off of the circular grill grate either from rotating of said circular grill or otherwise. The circular grill grate rotates atop the base, which includes securing means to secure the accessory onto an existing grill grate. At least one handle extends vertically and is provided to aid in rotation of the circular grill grate.

20 Claims, 15 Drawing Sheets

ROTATING GRILL TOP ACCESSORY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of grilling devices, more specifically, a grill grate that can rotate about a base that can rest atop another grill grate of an existing grill.

Grill grates can become dirty and rusty over time, which can detract any desire for using. This is especially true where a grill is in a public location where others have left the grill grate in a dirty condition or where extensive corrosion has occurred to the existing grill grate.

Furthermore, traditional grill grates do not offer any rotating properties so as to aid an end user in accessing foods located on different areas of the grill grate.

The present invention seeks to overcome the problems associated with grill grates that are dirty, corroded, and not maneuverable while positioned on the grill. The present invention offers a rotating grill top accessory that secures itself atop an existing grill grate that may be dirty or corroded, and of which can rotate the circular grill grate thereon so as to provide greater ease in accessing all areas of the circular grill grate, and of which also includes at least one handle that aids an end user in rotating or ceasing rotation of the circular grill grate, while providing a slim design that enables the grill cover to close thereon.

B. Discussion of the Prior Art

As a preliminary note, it should be stated that there is an ample amount of prior art that deals with rotating grill top accessory. As will be discussed immediately below, no prior art discloses a rotating grill top accessory that consists of a base from which a bearing rotates a round grill top; wherein the accessory can be placed upon an existing grill top; wherein the accessory has a handle that can aid in rotating the round grill about the base; wherein the accessory features a lip along an outer periphery of said round grill that will prevent items from rolling off when rotating said round grill; and wherein securing means are included to secure the accessory to the grill top of said existing grill.

The Spehle et al. Patent (U.S. Pat. No. 7,063,006) discloses a fire pit grill apparatus that consists of a tri-pod that extends over an open fire from which a motor descends a rotating grill. However, apparatus cannot be placed atop an existing grill grate and used to rotate food thereon.

The McGee Patent (U.S. Pat. No. 3,512,515) discloses an outdoor broiler having rotary grill. However, the rotary grill is integrated into the actual grill and is not an accessory that is placed upon the grill grate of an existing grill.

The Atkinson Patent (U.S. Pat. No. 3,033,190) discloses a rotary grill for a cooking device. Again, the rotary grill is integrated into the actual grill and is not an accessory that is placed upon the grill grate of an existing grill.

The Thompson Patent (U.S. Pat. No. 3,657,996) discloses a barbeque that has a rotatably mounted grill for holding the foods in which a device prevents the travel of liquid fat to an outer peripheral edge. However, the rotatably mounted grill is not an accessory that can be placed upon a grill grate of an existing grill.

The Patent Whitehouse (U.S. Pat. No. 5,787,873) discloses a retro-fit barbecue grill grid gear drive assembly. However, the assembly is integrated into the actual grill and is not an accessory that is placed upon the grill grate of an existing grill.

The Lehtovaara Patent (U.S. Pat. No. 4,129,111) discloses a bearing assembly for barbecues. Again, the assembly is integrated into the actual grill and is not an accessory that is placed upon the grill grate of an existing grill.

The Neyman et al. Patent (U.S. Pat. No. 4,724,753) discloses a barbecue apparatus having a vertical post from which a plurality of vertically and radially openings to connect support grills, fire pans, steam pans, etc. However, the apparatus is not an accessory that is placed upon the grill grate of an existing grill.

The Plymale Patent (U.S. Pat. No. 6,029,565) discloses a rotating barbecue grill. Again, the rotating grill is integrated into the actual grill and is not an accessory that is placed upon the grill grate of an existing grill.

The Yoon Patent (U.S. Pat. No. 6,929,001) discloses a rotating barbecue grill comprised of a gridiron disk, a shaft extending therefrom in perpendicular orientation, a bowl, and a motor. However, the rotating grill is integrated into the actual grill and is not an accessory that is placed upon the grill grate of an existing grill.

While the above-described devices fulfill their respective and particular objects and requirements, they do not describe a rotating grill top accessory that consists of a base from which a bearing rotates a round grill top; wherein the accessory can be placed upon an existing grill top; wherein the accessory has a handle that can aid in rotating the round grill about the base; wherein the accessory features a lip along an outer periphery of said round grill that will prevent items from rolling off when rotating said round grill; and wherein securing means are included to secure the accessory to the grill top of said existing grill. In this regard, the rotating grill top accessory departs from the conventional concepts and designs of the prior art.

SUMMARY OF THE INVENTION

The rotating grill top accessory involves a circular grill grate that is rotatably mounted atop a base that is placed atop an existing grill grate of an existing grill. The circular grill grate has a lip along a periphery of said grill grate so as to prevent items from rolling off of the circular grill grate either from rotating of said circular grill or otherwise. The circular grill grate rotates atop the base, which includes securing means to secure the accessory onto an existing grill grate. At least one handle extends vertically and is provided to aid in rotation of the circular grill grate.

It is an object of the invention to provide a rotating grill top accessory that attaches onto an existing grill grate and of which can rotate thereon.

A further object of the invention is to provide the rotating grill top accessory with a slim design such that the rotating grill grate can be secured atop an existing grill grate and still enable a grill cover to close thereon.

A further object of the invention is to provide a circular grill grate that is secured to a base that is secured to the existing grill grate.

A further object of the invention is to provide a base that includes legs that extend there under and of which stabilizes the base atop the existing grill grate as well as to enable a means of resting the accessory on any other surface before or after use upon a grill.

A further object of the invention is to provide a circular grill grate with a circular member that has a retaining effect, which prevents foods from rolling off of the top surface of the circular grill grate irregardless of whether the circular grill grate is rotating.

A further object of the invention is to provide a circular grill grate with at least one handle built into the circular grill grate which aids in rotating the circular grill grate about the base as well as to stabilize via an object to grab from the circular grill.

These together with additional objects, features and advantages of the rotating grill top accessory will be readily apparent to those of ordinary skill in the art upon reading the following detailed description of presently preferred, but nonetheless illustrative, embodiments of the rotating grill top accessory when taken in conjunction with the accompanying drawings.

In this respect, before explaining the current embodiments of the rotating grill top accessory in detail, it is to be understood that the rotating grill top accessory is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rotating grill top accessory.

It is therefore important that the claims be regarded as including such equivalent construction insofar as they do not depart from the spirit and scope of the rotating grill top accessory. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
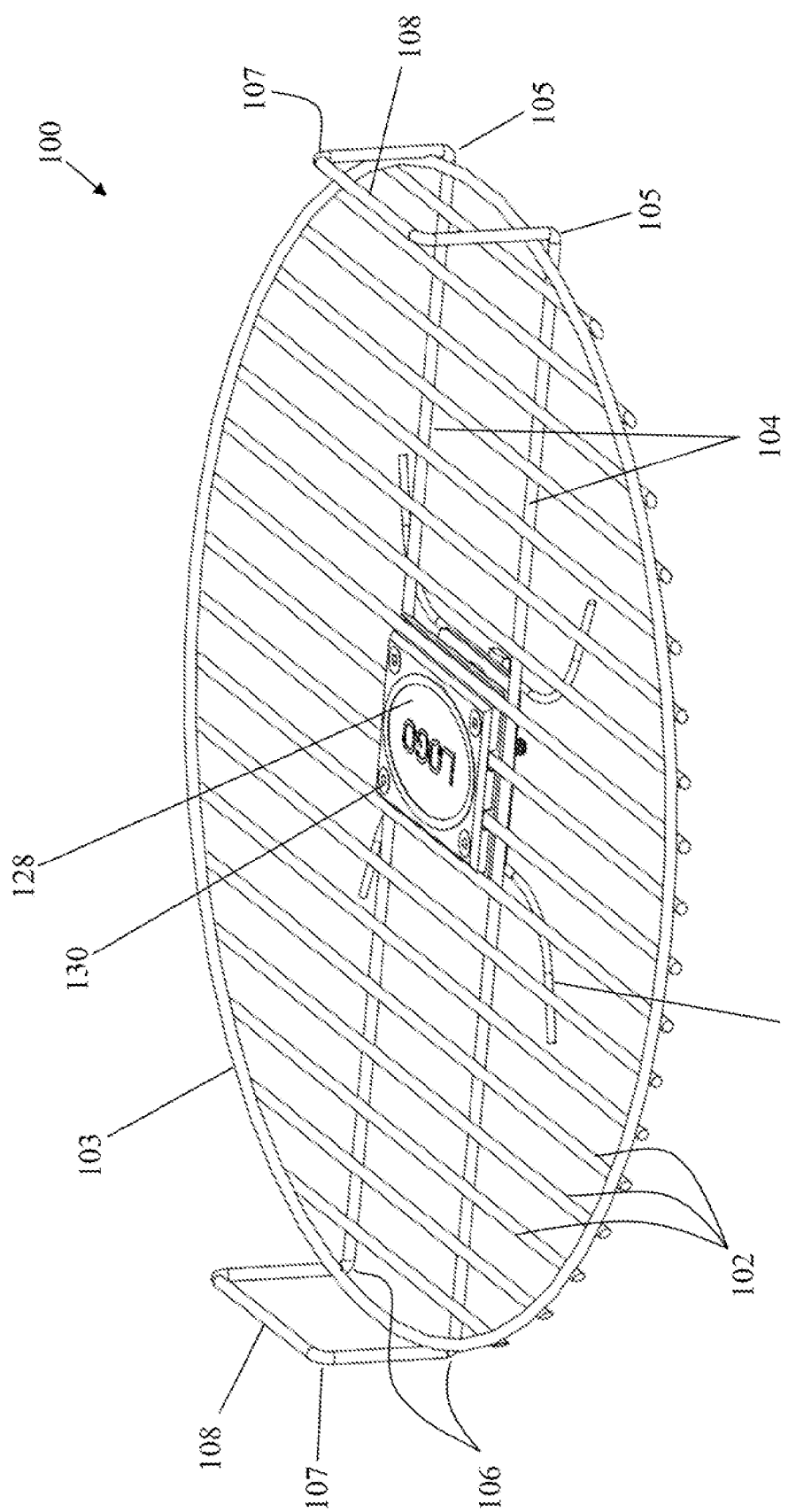
FIG. 1 illustrates an isometric view of the rotating grill top accessory by itself and fully assembled.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-12. A rotating grill top accessory 100 (hereinafter invention) includes a circular grill grate 101 of standard construction. The circular grill grate 101 is comprised of a plurality of lateral members 102 that are attached under a circular member 103. The lateral members 102 are secured to the circular member 103 via means consisting of welding. The lateral members 102 vary in length and are parallel with one another so as to form a circular array absent the circular member 103.

At least two cross-braces 104 cross under the lateral members 102. The cross-braces 104 are in perpendicular orientation with respect to the lateral members 102. Again, the cross-braces 104 attach under the lateral members 102 via securing means consisting of welding.

The cross-braces 104 each have a first bend 105 and a second bend 106 that extend the remaining portion of the cross-brace vertically at each end of the circular grill grate 101. The cross-braces 104 have third bends 107 that rotate the cross-braces horizontally to form a loop out of the cross-braces 104, and thus form handles 108 at each end of the circular grill grate 101.

The entire construction of the circular grill grate 101 is made of a metal, preferably a stainless steel or steel alloy with an adequate proportion of Chromium so as to resist oxidation, which is ideal in a cooking environment.

It shall be noted that the circular grill grate 101 may have a different shape other than a circle. Furthermore, the circular grill grate 101 may have a square, rectangular, triangular, or polygonal shape (see FIG. 12). Furthermore, it shall be noted that the area of the circular grill grate 101 can be increased or reduced to accommodate existing grill grates 115 of varying sizes.

The circular grill grate 101 rest atop a base 110. The base 110 includes a grate bracket 111. The grate bracket 111 has a plurality of threaded holes 112 integrated therein and the purpose of which will be discussed below. The grate bracket 111 is secured atop a ball bearing 113. The ball bearing 113 is sandwiched between the grate bracket 111 and a base bracket 114 so as to provide rotational movement there between. In other words, upon securement of the base bracket 114 to an existing grill grate 115, both the grate bracket 111 and the circular grill grate 101 can rotate thereon (see FIG. 3) as indicated by rotational arrow 116.

Figure 9:
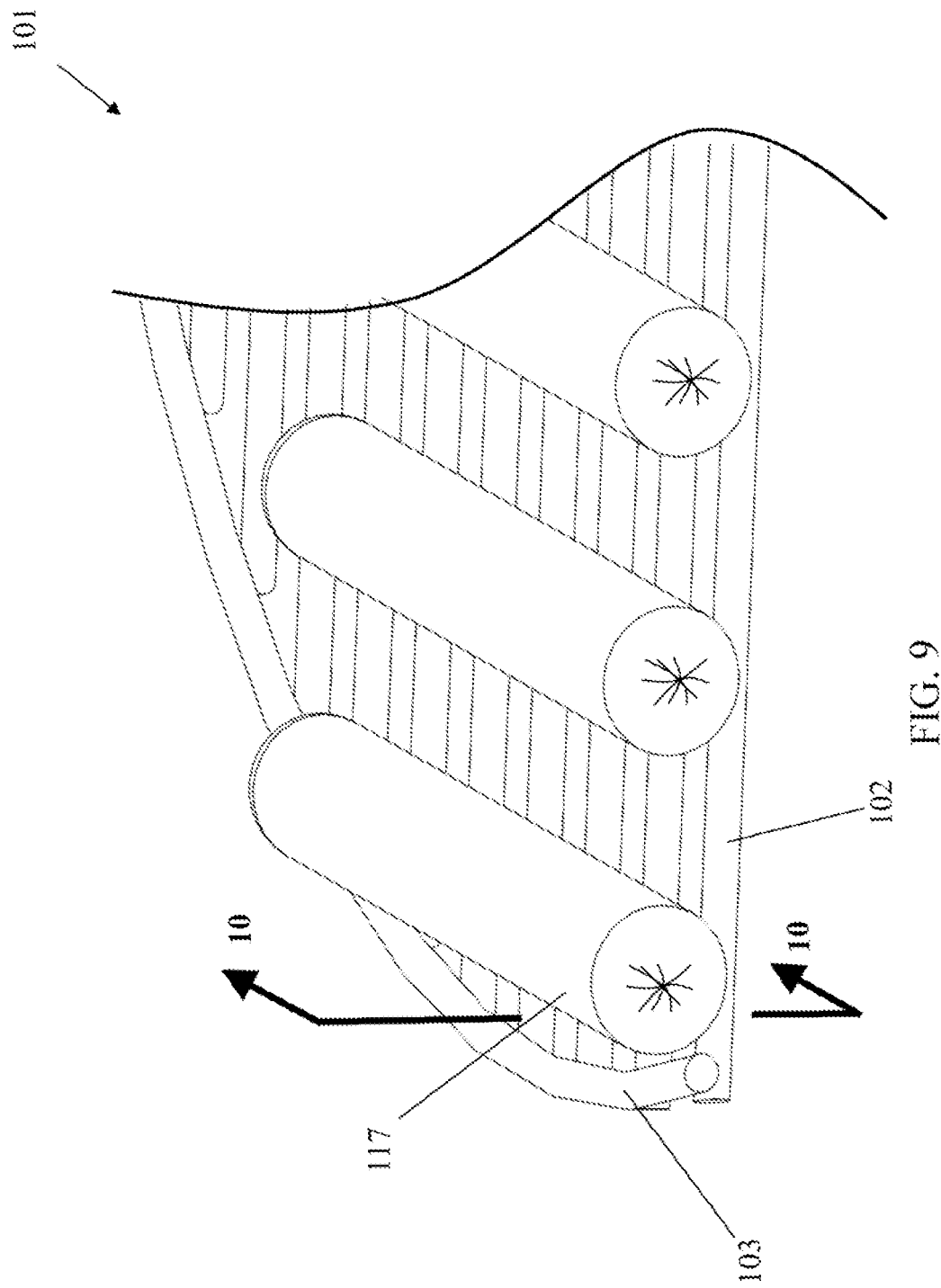
FIG. 9 illustrates a detailed view of the circular grill grate with food (hotdogs) resting thereon.
Figure 10:
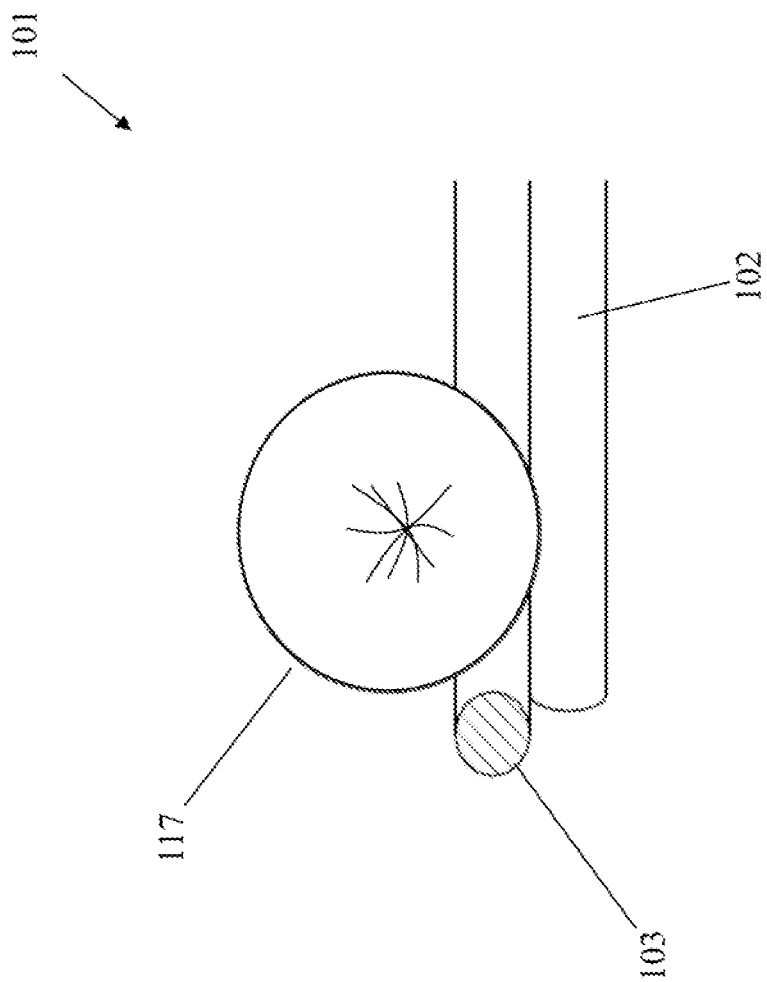
FIG. 10 illustrates a cross-sectional view of the rotating grill top accessory along line 10-10 in FIG. 9 and depicting in more detailing the retaining effect the circular member imposes upon food.
Figure 11:
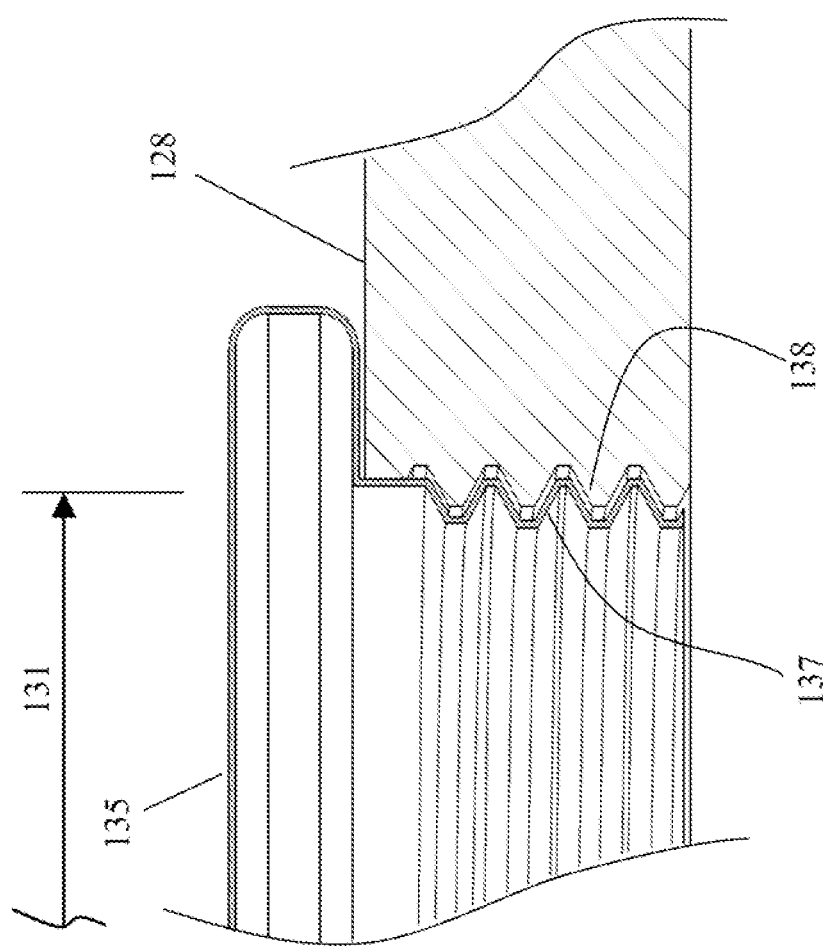
FIG. 11 illustrates a detailed cut-away view of the threaded cap screwed onto the hole of the cover bracket and detailing the internal threading required.
Figure 12:
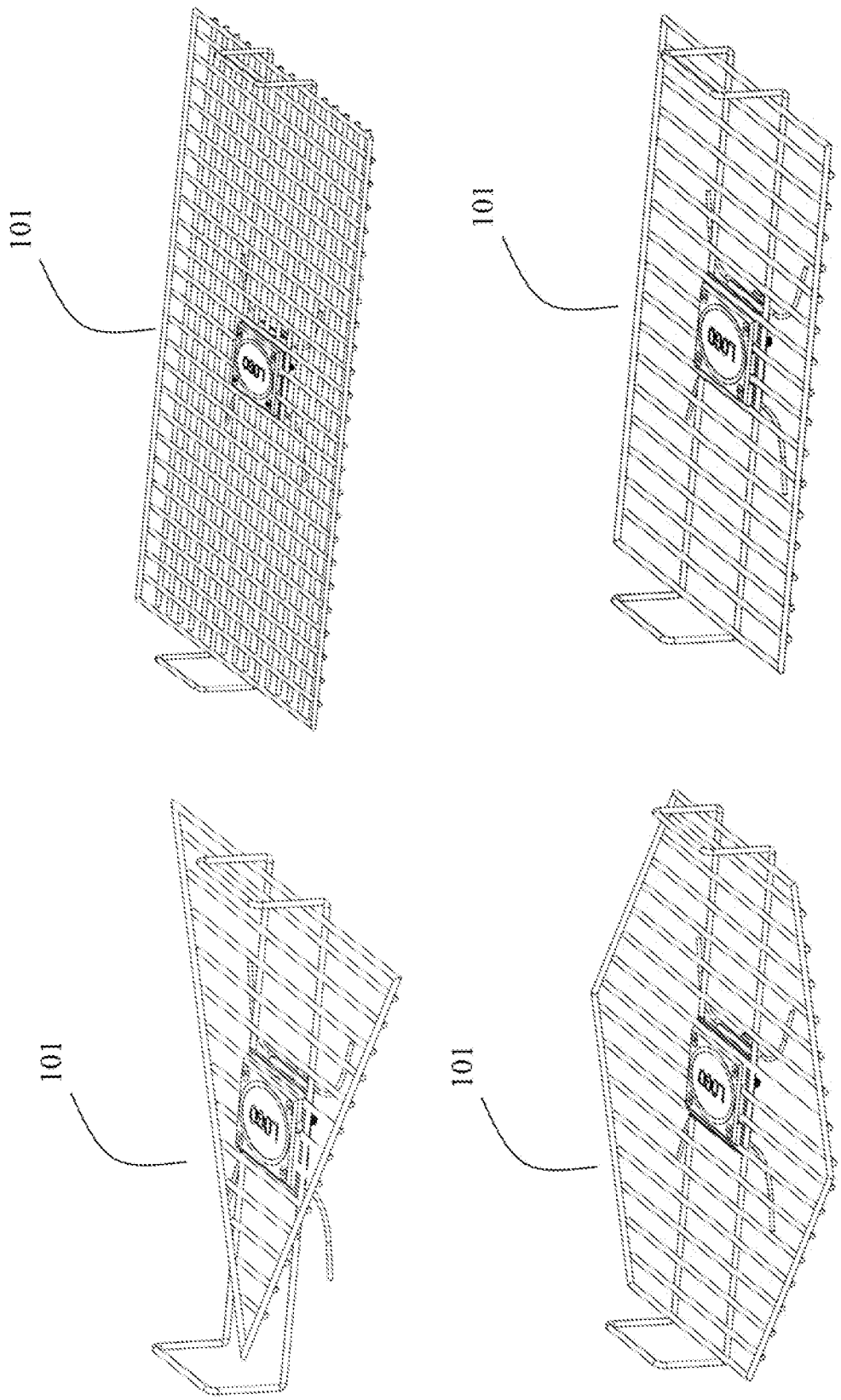
FIG. 12 illustrates a plurality of shapes of the circular grill grates that can be used.

The circular member 103 provides a useful function in addition to securing the lateral members 102. The circular member 103 forms a curb or retaining effect as to food 117 resting atop the circular grill grate 101. Referring to FIGS. 9-10, food 117 is less inclined to roll off of the circular grill grate 101 in view of the circular member 103 encircling the periphery of the circular grill grate 101, and also atop ends of the lateral members 102. The retaining effect of the circular member 103 is more evident when rotating the circular grill grate 101 atop the base 110, which creates tangential acceleration of loose items resting thereon, especially food 117 having a circular cross-section in that said food 117 can roll thereon.

The handles 108 formed from the cross-braces 104 aid in rotation of the circular grill grate 101 upon the base 110. However, it shall be noted that applying a force on any lateral member 102 or any portion of the circular member 103 may cause the circular grill grate 101 to rotate atop the base 110.

Figure 2A:
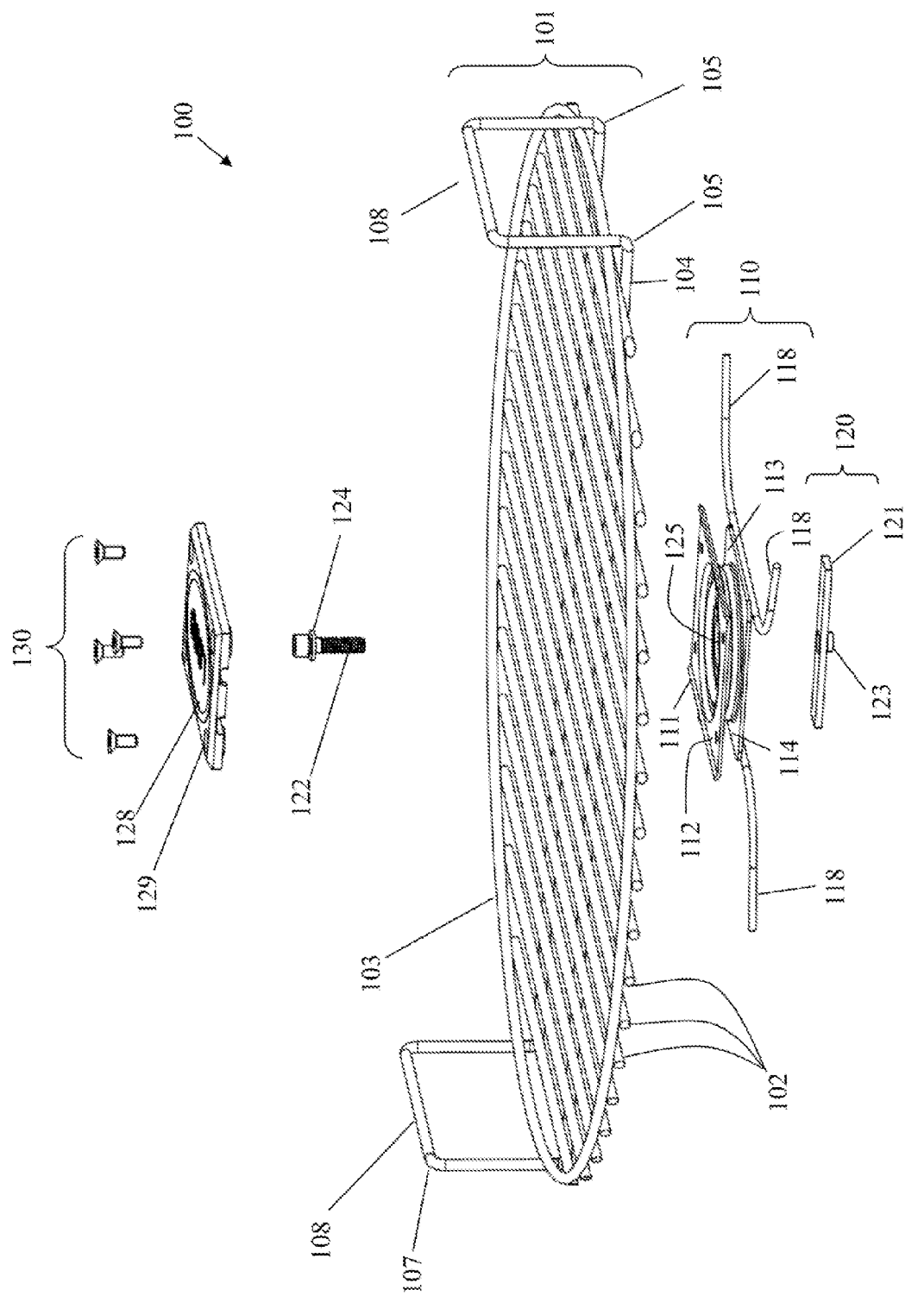
FIG. 2A illustrates an exploded, isometric view of the components of the rotating grill top accessory, and detailing a base having a plurality of legs extended therefrom.

Referring to FIG. 2A, a plurality of legs 118 extend from beneath the grate bracket 111. The legs 118 are secured to the grate bracket 111 via welding. The legs 118 stabilize the base 110 to the existing grill grate 115. The legs 118 are actually "U" shaped bars that form pairs of legs extending from either side of the grate bracket 111. The legs 118 are made of a metal, preferably a stainless steel or steel alloy with an adequate proportion of Chromium so as to resist oxidation, which is ideal in a cooking environment.

Figure 2B:
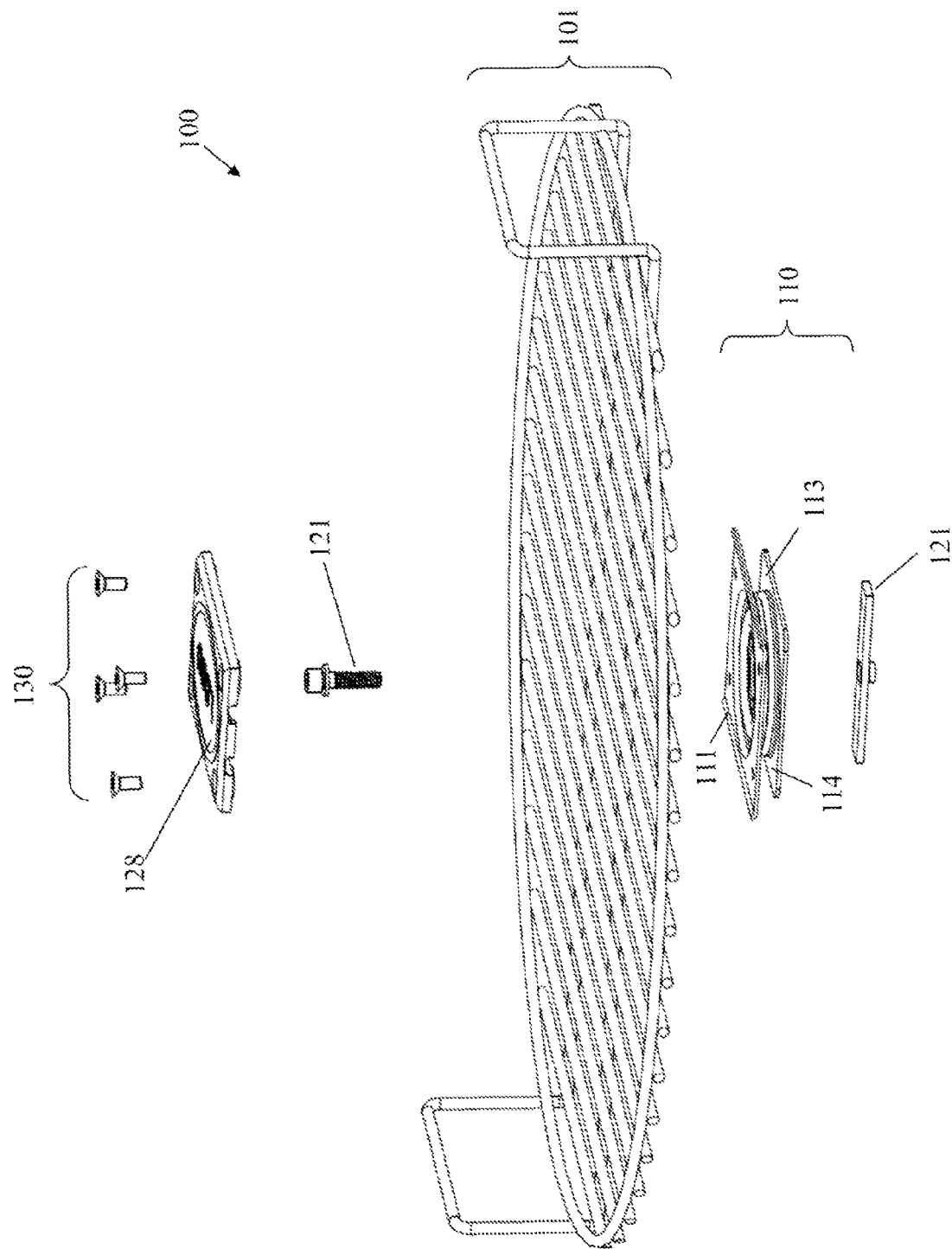
FIG. 2B illustrates an exploded, isometric view of the components of the rotating grill top accessory, and detailing a base having a plate extended therefrom.

Referring to FIG. 2B, the grill bracket 114 is without the legs 118, and is seated atop the existing grill grate 115. Again, the grill bracket 114, along with the grate bracket 111 and the ball bearing 113 are made of a metal, preferably a stainless steel or steel alloy with an adequate proportion of Chromium so as to resist oxidation, which is ideal in a cooking environment.

The base 110 is secured to the existing grill grate 115 via securing means 120. The securing means 120 consists of a bar 121 and bolt 122. The bar 121 has a threaded hole 123 into which the bolt 122 is inserted. The bolt 122 has a shoulder 124. It shall be noted that the grate bracket 111 has an opening 125 through which the bolt 122 passes. Coincidentally, the grill bracket 114 has a hole 126 up to which the shoulder 124 of the bolt 122 rests upon.

Before connecting the bolt 122 to the bar 121, the base 110 is placed atop the existing grill grate 115, and the circular grill grate 101 is seated upon the grate bracket 111. Next, the bolt 122 is inserted into the hole opening 125 of the grate bracket 111 and into the hole 126 of the grill bracket 114 before coming to a halt once the shoulder 124 of the bolt 122 hits the top surface of the grill bracket 114. Next, the bar 121 is continually screwed onto the bolt 122 until the bar 121 impacts a bottom surface 127 of the existing grill grate 115 at which point the base 110 is secured atop the existing grill grate 115. It shall be worth noting that the circular grill grate 101 is not required in order to secure the base 110 onto the existing grill grate 115.

A cover plate 128 is used to secure the circular grill grate 101 to the base 110 only after the base 110 is secured to the existing grill grate 115 via the securing means 120. The cover plate 128 has a plurality of holes 129 that align with and correspond to the threaded holes 112 of the grate bracket 111 such that screws 130 can be inserted in order to secure the cover plate 128 atop the circular grill grate 101, and thus secure the circular grill grate 101 to the base 110.

Figure 2C:
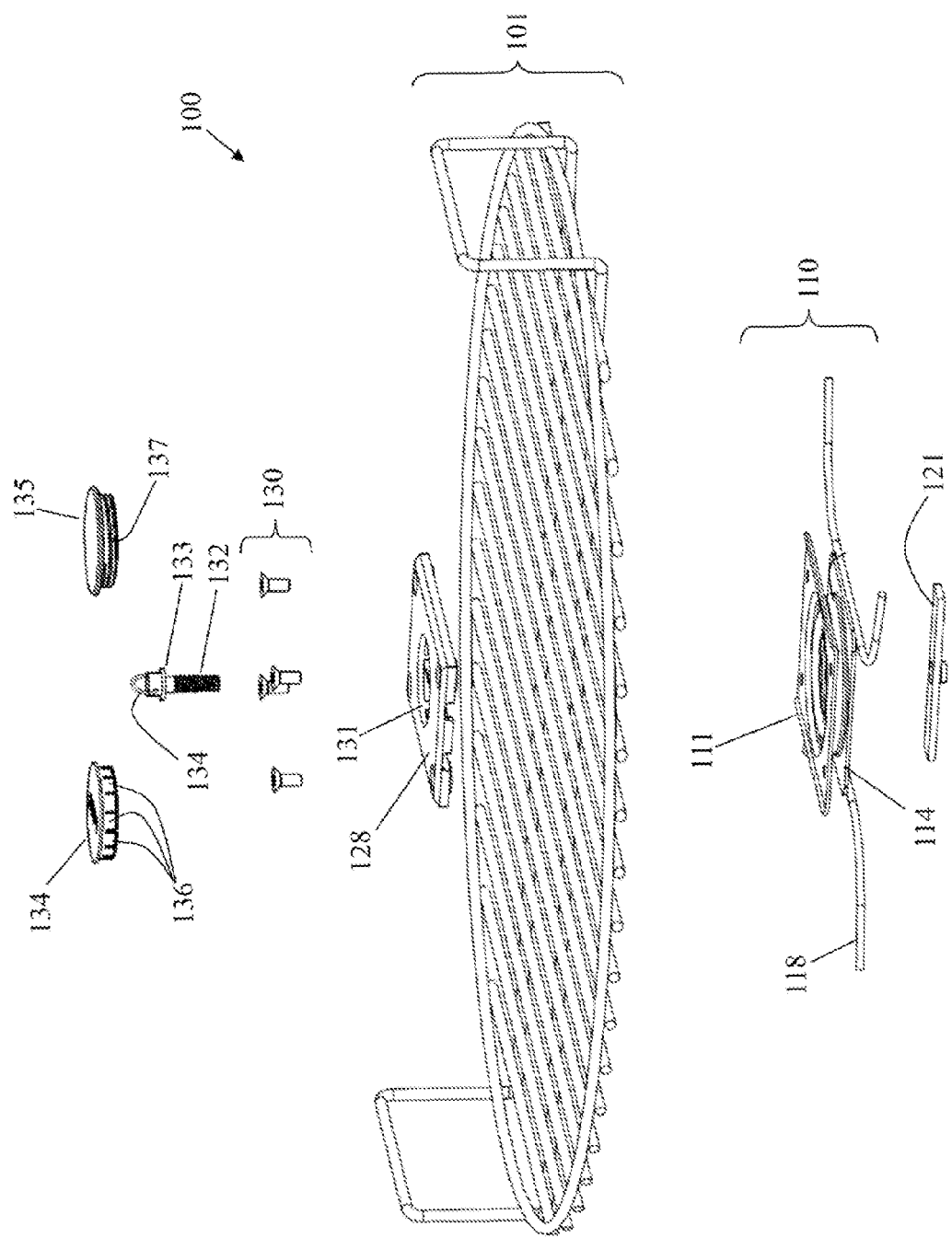
FIG. 2C illustrates an exploded, isometric view of the components of the rotating grill top accessory, and detailing bracket having an opening through which a bolt may pass there through before enclosing said one with one of the caps depicted above.
Figure 3:
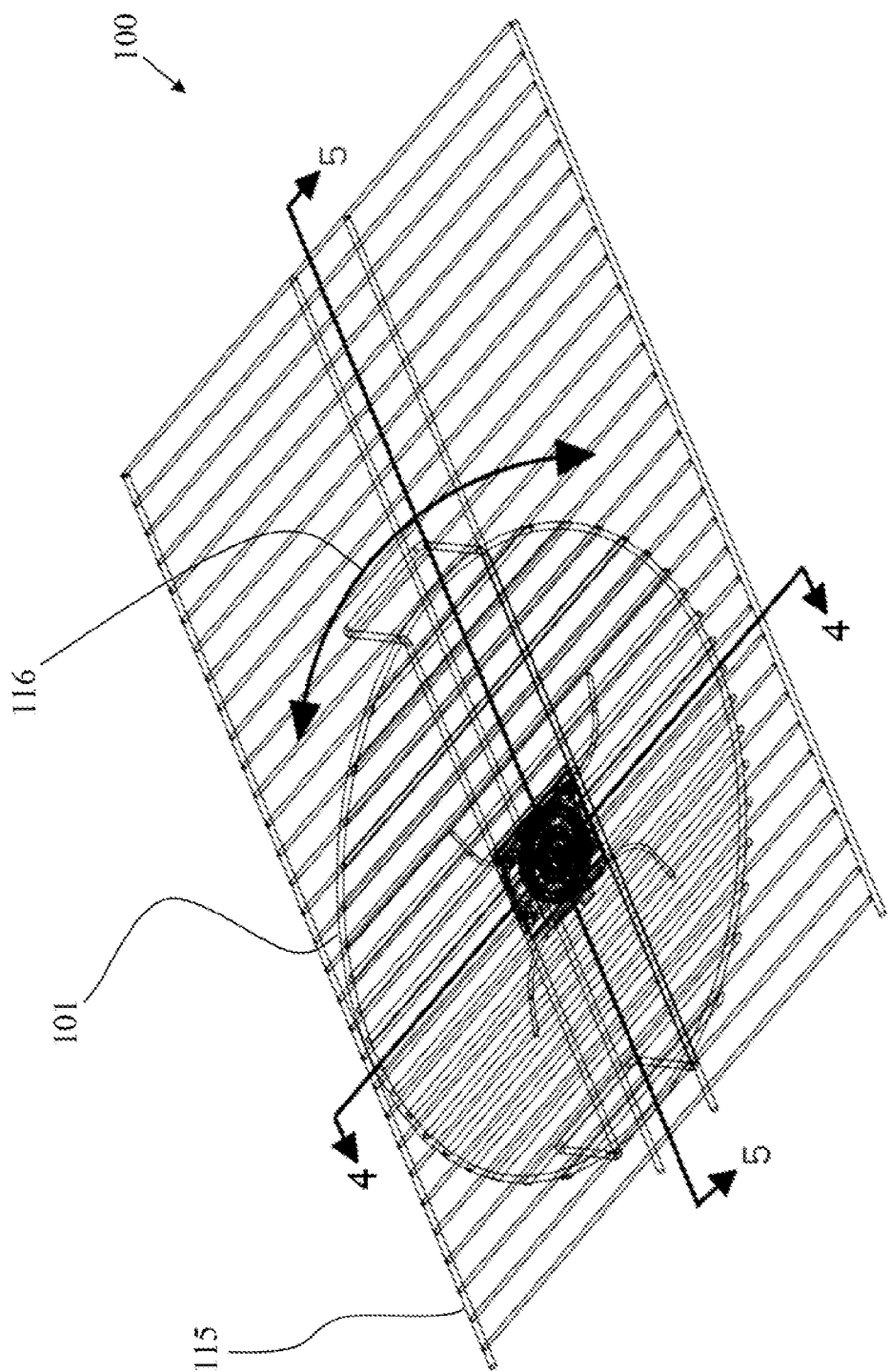
FIG. 3 illustrates an isometric view of the rotating grill top accessory placed and secured atop a grill grate of an existing grill.
Figure 4A:
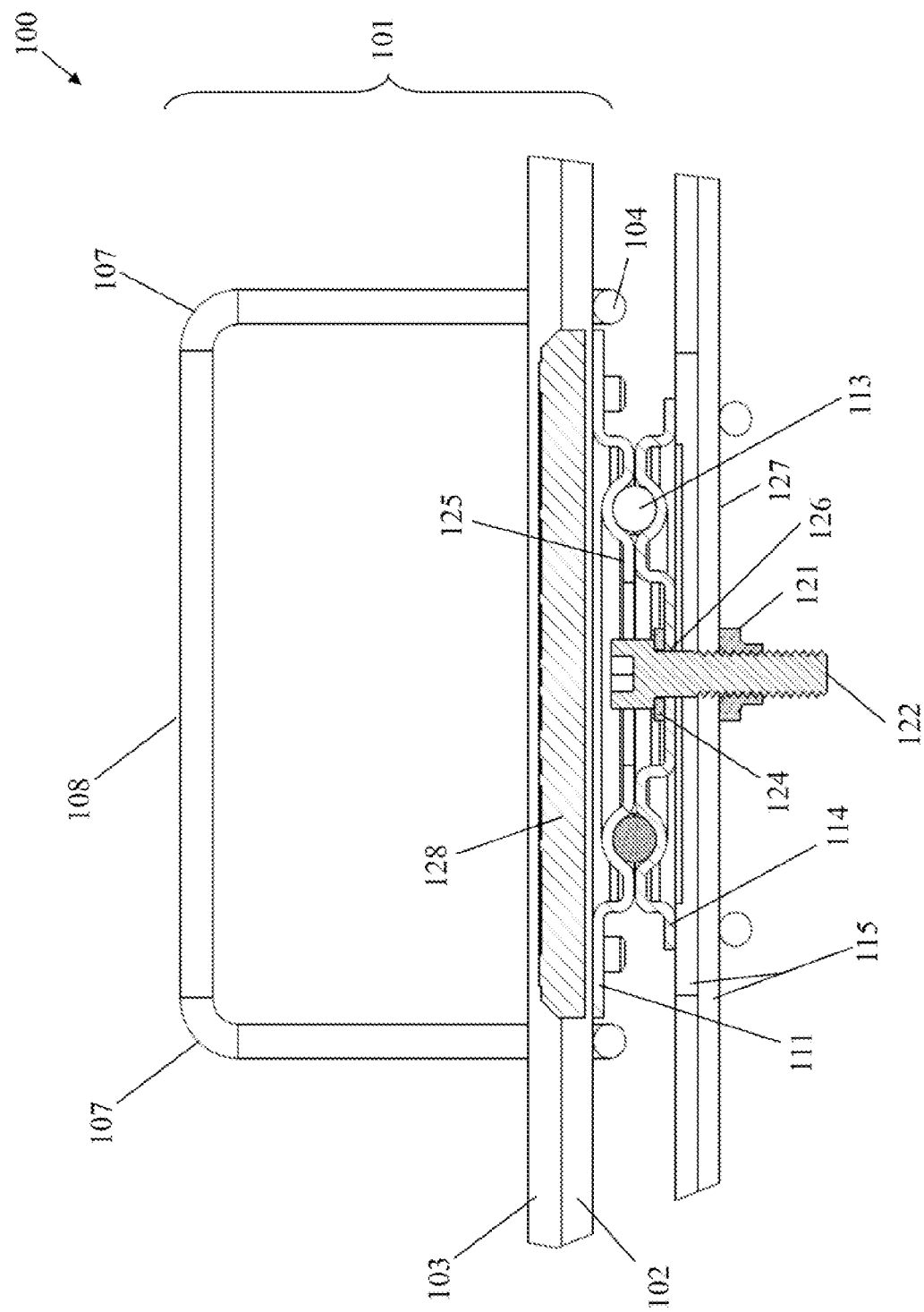
FIG. 4A illustrates a cross-sectional view of the rotating grill top accessory along line 4-4 in FIG. 3 and depicting the inter-relation of the handles, bracket, securing means, circular grill grate, and existing grill grate.
Figure 4B:
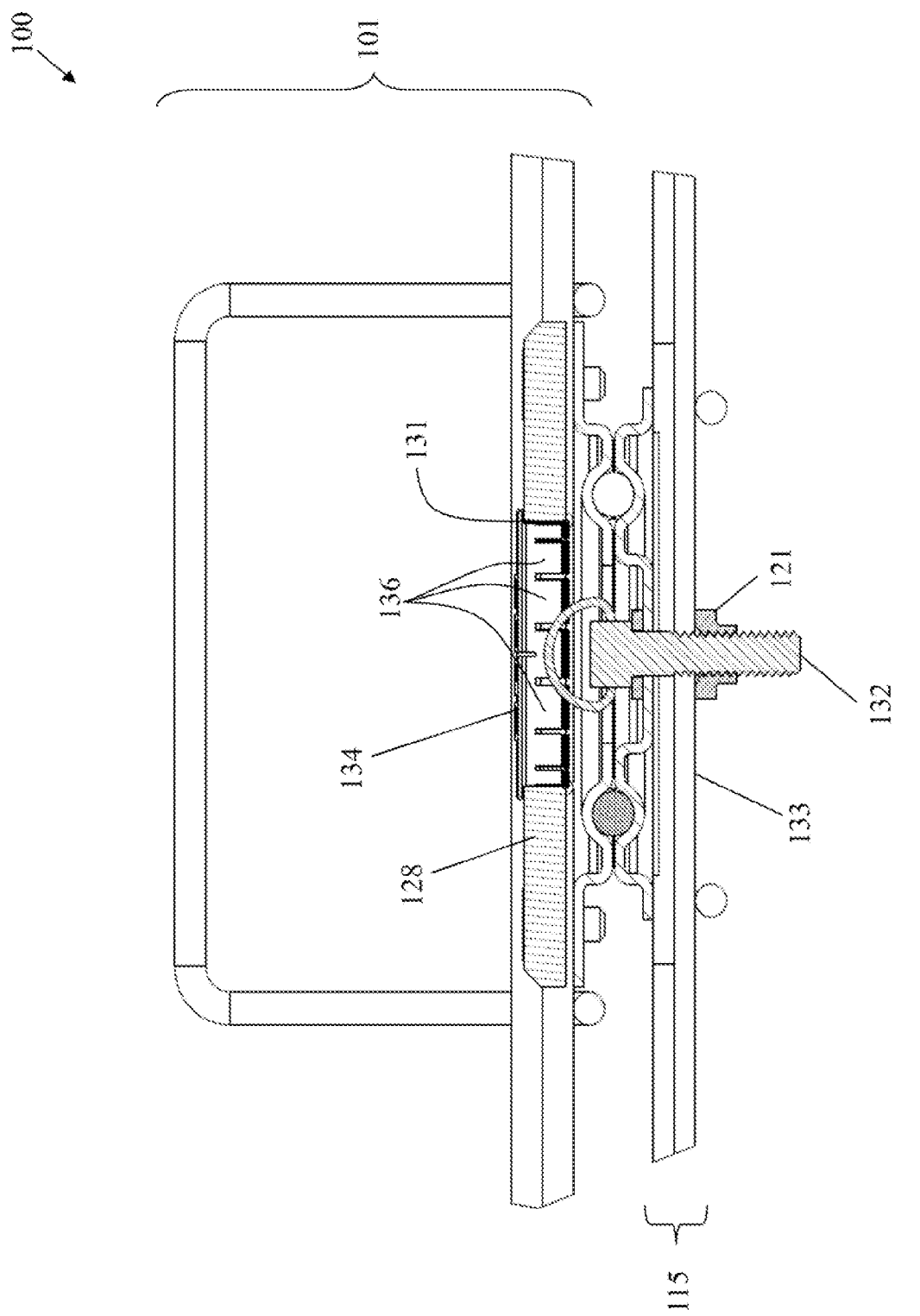
FIG. 4B illustrates a cross-sectional view of the rotating grill top accessory along line 4-4 in FIG. 3 and depicting the inter-relation of the handles, bracket, cap, bolt, securing means, circular grill grate, and existing grill grate.
Figure 5:
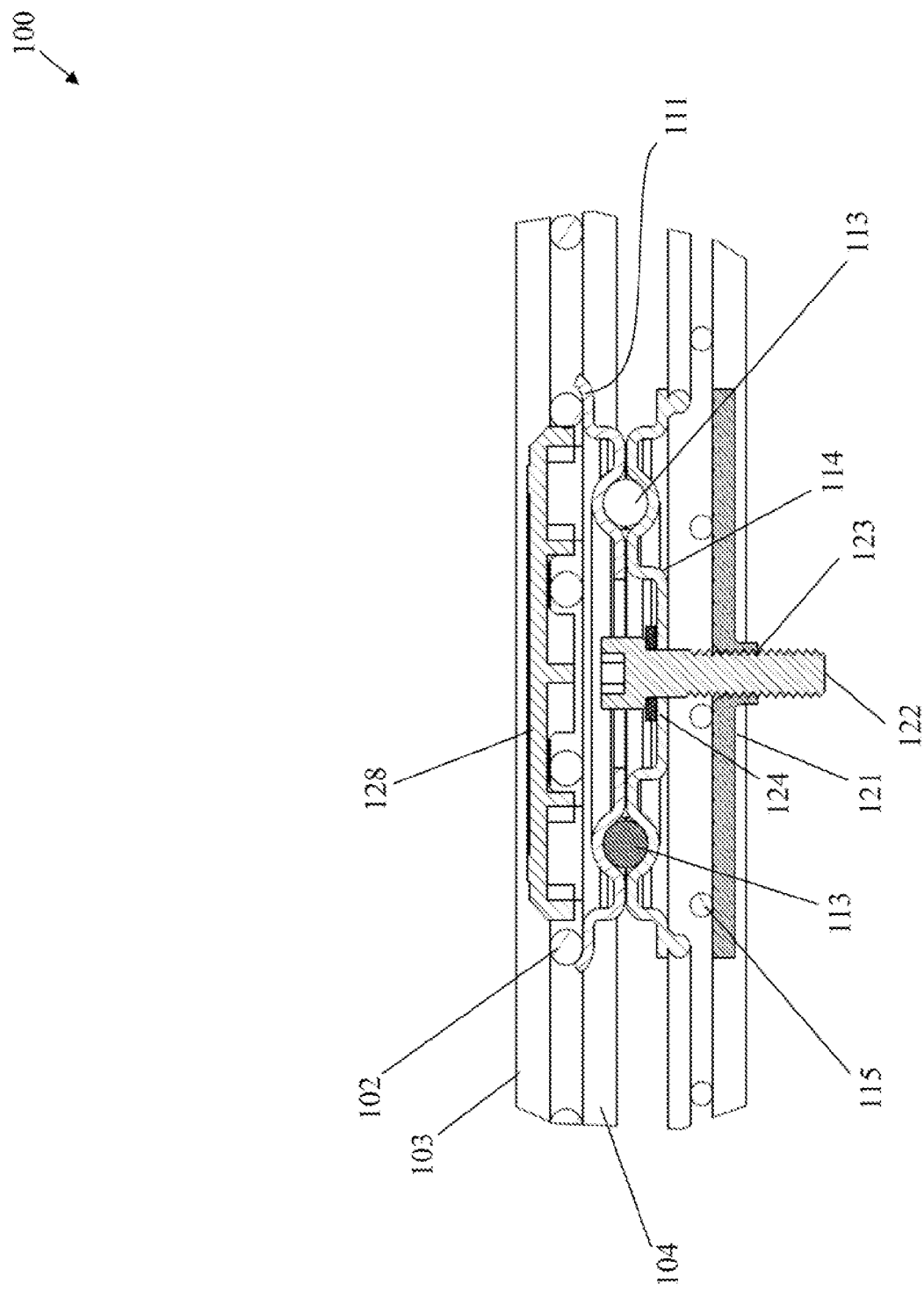
FIG. 5 illustrates a cross-sectional view of the rotating grill top accessory along line 5-5 in FIG. 3 and depicting the inter-relation of the handles, bracket, securing means, circular grill grate, and existing grill grate.

Referring to FIGS. 2C and 4B, the invention 10 has another way of employing the securing means 120 to secure the base 110 atop the existing grill grate 115.

The cover plate 128 includes a hole 131 through which a bolt 132 passes there through. Next, the bolt 132 is inserted into the hole opening 125 of the grate bracket 111 and into the hole 126 of the grill bracket 114 before coming to a halt once the shoulder 133 of the bolt 132 hits the top surface of the grill bracket 114. Next, the bar 121 is continually screwed onto the bolt 132 until the bar 121 impacts the bottom surface 127 of the existing grill grate 115 at which point the base 110 is secured atop the existing grill grate 115.

It is worth mentioning that the cover plate 128 may be secured atop the circular grill grate 101 and to the threaded holes 112 of the grate bracket 11 thus securing the circular grill grate 101 to the base 110 before securing the base 110 to the existing grill grate 115 via the securing means 120. This is accomplished via the hole 131 in the cover plate 128.

Figure 8:
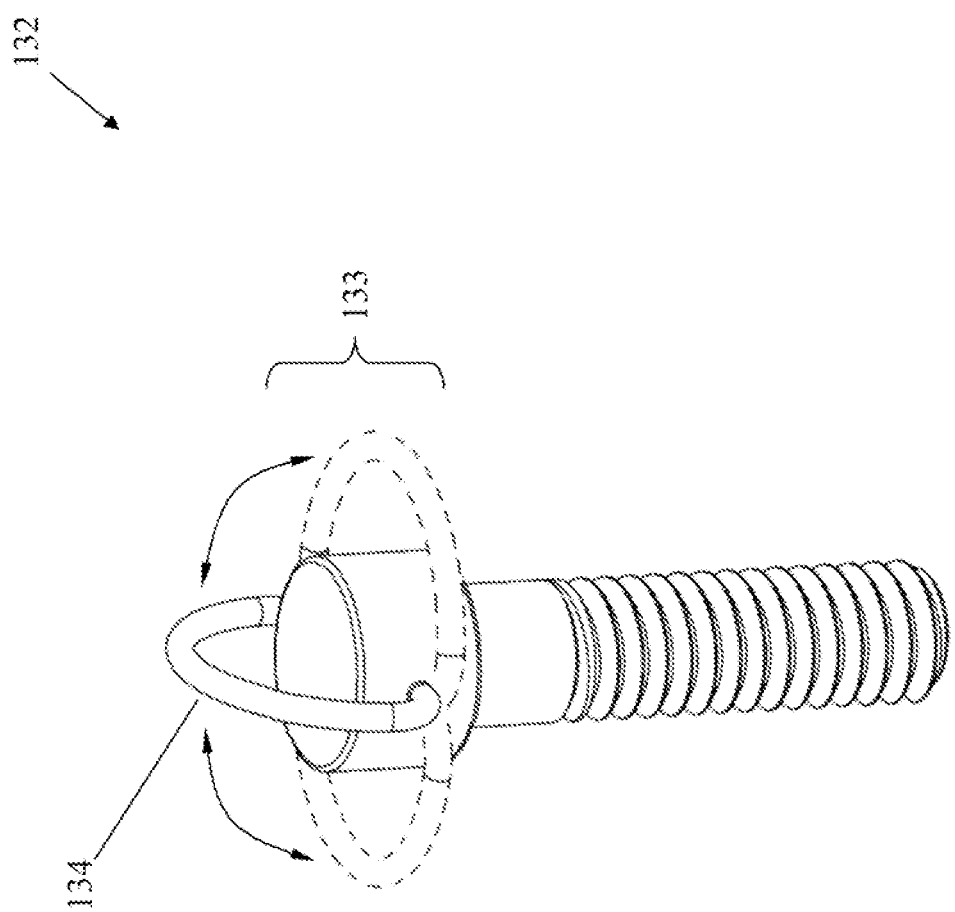
FIG. 8 illustrates an isomeric view of the bolt including rotating means integrated thereon and for use with the embodiment of the rotating grill top accessory as depicted in FIG. 2D.

The bolt 132 includes a ring 134 that rotates about the shoulder 133 and of which aids in rotating the bolt 132 when recessed within the base 110 and screwed to the bar 121. Referring to FIG. 8, the ring 134 can rotate at least 180 degrees about the shoulder 133 so as to lay flat in a compacted state when not being screwed or unscrewed with respect to the bar 121.

The hole 131 of the cover plate 128 includes either a snap cap 134 or screw cap 135 that secures upon the hole 131 so as to cover the hole 131 and to prevent food 117 or related debris from entering. The snap cap 134 has a plurality of members 136 that flex upon insertion or removal from the hole 131 and of which act to secure the snap cap 134 thereon. The screw cap 135 has a threaded end 137 that would screw into internal threading 138 located along the interior of the hole 131 (see FIG. 11).

Figure 6:
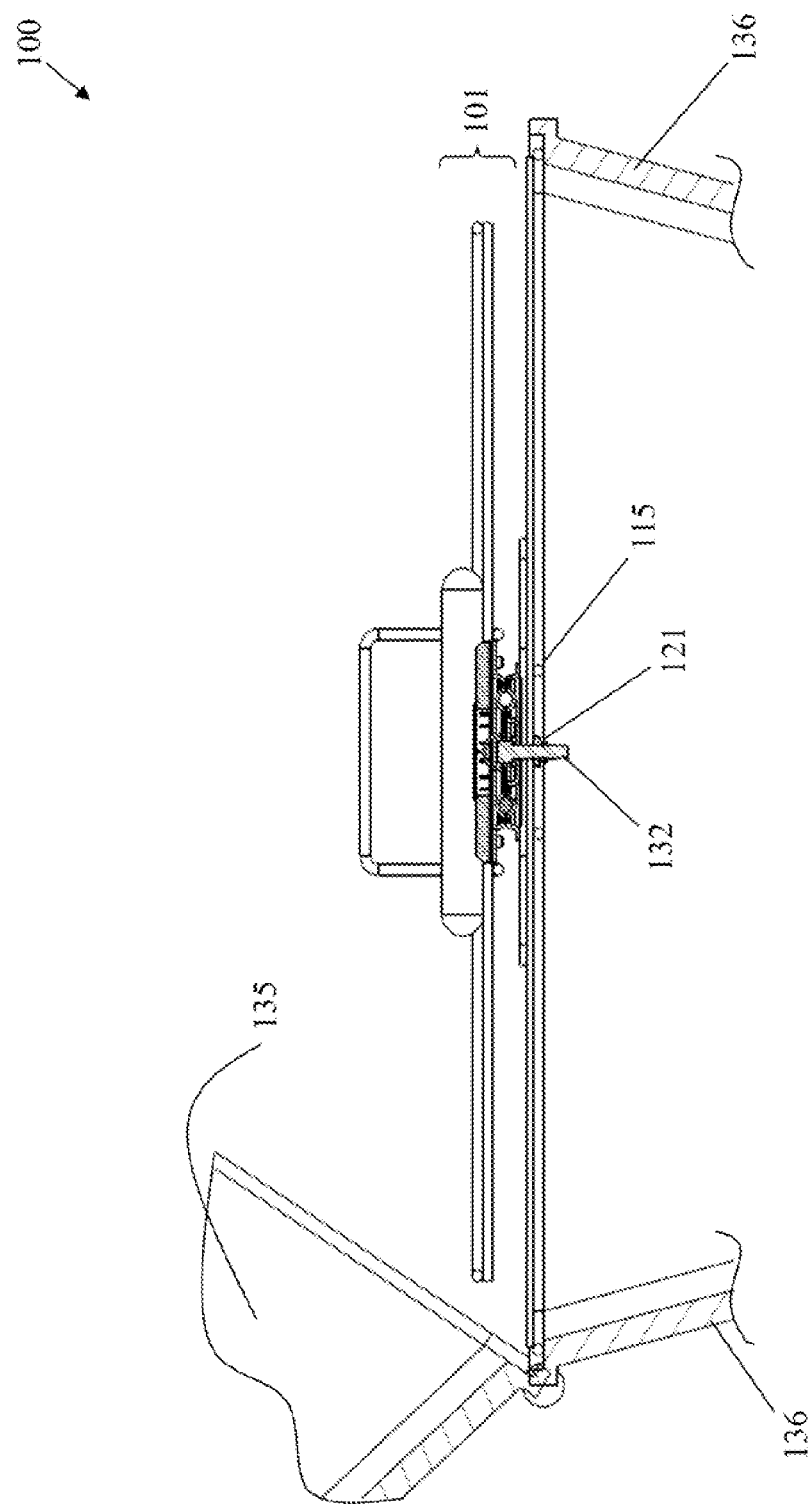
FIG. 6. Illustrates a front side view of the rotating grill top accessory placed and secured atop an existing grill grate and further detailing the slim design of the rotating grill top accessory within a grill and grill cover.
Figure 7:
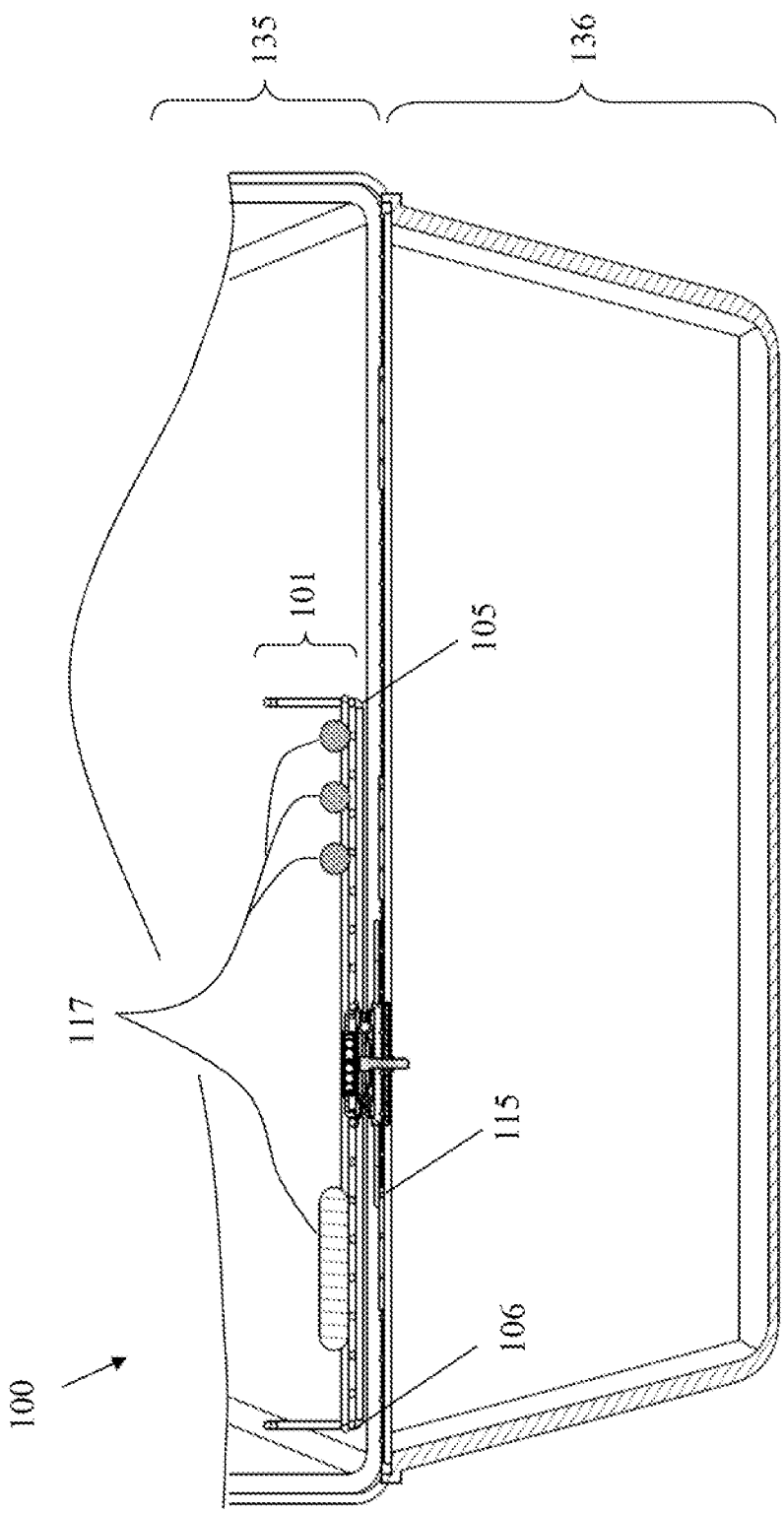
FIG. 7 illustrates an end side view of the rotating grill top accessory placed and secured atop an existing grill grate, and also detailing food located thereon, and again detailing the slim design of the rotating grill top accessory within a grill and grill cover.

Referring to FIGS. 6-7, the invention 10 has an overall slim design, and an overall width of no less than 1 inch and no greater than 5 inches. However, it shall be noted that due to the slim design of the invention 10, normal operation of a grill cover 135 is not impeded by the invention 10. To put it in other words, the grill cover 135 can close atop a grill 136 and completely cover the invention 10 as secured atop the existing grill grate 115.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A rotating grill top accessory comprising:
   a circular grill grate that can secure atop a base;
   wherein said base can secure to an existing grill grate of an existing grill via securing means;
   wherein the circular grill grate can rotate atop said base;
   wherein the rotating grill top accessory can attach atop an existing grill grate, and a grill cover can close in normal operation;
   wherein the base further includes a ball bearing sandwiched between a grate bracket and a grill bracket; wherein the grate bracket attaches to the circular grill grate; wherein both the grate bracket and the circular grill grate can rotate with respect to the grill bracket;
   wherein the grill bracket is secured atop the existing grill grate via securing means;
   wherein the securing means includes a bolt having a shoulder that passes through a hole located in both the grate bracket and ball bearing before said shoulder rests atop a hole in the grill bracket before screwing onto a bar positioned under the existing grill grate such that the base is secured atop the existing grill grate; wherein the bar has a threaded hole for securing the bolt thereon;
   wherein a cover plate having holes aligned with threaded holes located in the grate bracket is screwed thereto, and of which the circular grill grate is securely sandwiched between the cover plate and the grate bracket; wherein the cover plate has a hole for accessing or inserting the bolt therein;
   wherein the bolt has a ring that rotates about a shoulder that folds up to aid in rotating said bolt or to fold flat when not in use;
   wherein a cap fits atop the hole of the cover plate so as to block food or related debris from falling into said hole.

2. The rotating grill top accessory as described in claim 1 wherein the circular grill grate includes a circular member that rest atop lateral members to form a retaining effect that prevents food from rolling off of the circular grill grate.

3. The rotating grill top accessory as described in claim 2 wherein cross-braces span perpendicularly underneath the lateral members before forming first, second, and third bends in order to form handles.

4. The rotating grill top accessory as described in claim 3 wherein the handles aid in controlling the rotation of the circular grill grate.

5. The rotating grill top accessory as described in claim 1 wherein the grill bracket has legs extending there under; wherein said legs stabilizes the base atop the existing grill bracket or any other surface.

6. The rotating grill top accessory as described in claim 1 wherein a cover plate having holes aligned with threaded holes located in the grate bracket is screwed thereto, and of which the circular grill grate is securely sandwiched between the cover plate and the grate bracket.

7. The rotating grill top accessory as described in claim 1 wherein the rotating grill top accessory has an overall height ranging from no less than 1 inch to no more than 5 inches.

8. The rotating grill top accessory as described in claim 1 wherein the circular grill grate has an overall shape comprising a circle, square, rectangle, triangle, or polygonal.

9. A rotating grill top accessory comprising:
   a circular grill grate that can secure atop a base;
   wherein said base can secure to an existing grill grate of an existing grill via securing means;
   wherein the circular grill grate can rotate atop said base;
   wherein the circular grill grate has at least one handle to aid in rotating the circular grill grate atop said base;
   wherein the rotating grill top accessory can attach atop an existing grill grate, and a grill cover can close in normal operation;
   wherein the base further includes a ball bearing sandwiched between a grate bracket and a grill bracket; wherein the grate bracket attaches to the circular grill grate; wherein both the grate bracket and the circular grill grate can rotate with respect to the grill bracket;
   wherein the grill bracket is secured atop the existing grill grate via securing means;
   wherein the securing means includes a bolt having a shoulder that passes through a hole located in both the grate bracket and ball bearing before said shoulder rests atop a hole in the grill bracket before screwing onto a bar positioned under the existing grill grate such that the base is secured atop the existing grill grate; wherein the bar has a threaded hole for securing the bolt thereon;
   wherein a cover plate having holes aligned with threaded holes located in the grate bracket is screwed thereto, and of which the circular grill grate is securely sandwiched between the cover plate and the grate bracket; wherein the cover plate has a hole for accessing or inserting the bolt therein;
   wherein the bolt has a ring that rotates about a shoulder that folds up to aid in rotating said bolt or to fold flat when not in use;
   wherein a cap fits atop the hole of the cover plate so as to block food or related debris from falling into said hole.

10. The rotating grill top accessory as described in claim 9 wherein the circular grill grate includes a circular member that rest atop lateral members to form a retaining effect that prevents food from rolling off of the circular grill grate.

11. The rotating grill top accessory as described in claim 10 wherein cross-braces span perpendicularly underneath the lateral members before forming first, second, and third bends in order to form handles.

12. The rotating grill top accessory as described in claim 9 wherein the grill bracket has legs extending there under, which stabilizes the base atop the existing grill bracket.

13. The rotating grill top accessory as described in claim 9 wherein a cover plate having holes aligned with threaded holes located in the grate bracket is screwed thereto, and of which the circular grill grate is securely sandwiched between the cover plate and the grate bracket.

14. The rotating grill top accessory as described in claim 9 wherein the rotating grill top accessory has an overall height ranging from no less than 1 inch to no more than 5 inches.

15. The rotating grill top accessory as described in claim 9 wherein the circular grill grate has an overall shape comprising a circle, square, rectangle, triangle, or polygonal.

16. A rotating grill top accessory comprising:
a circular grill grate that can secure atop a base;
wherein said base can secure to an existing grill grate of an existing grill via securing means;
wherein the circular grill grate can rotate atop said base;
wherein the circular grill grate has at least one handle to aid in rotating the circular grill grate atop said base;
wherein the rotating grill top accessory can attach atop an existing grill grate, and a grill cover can close in normal operation;
wherein the circular grill grate includes a circular member that rest atop lateral members to form a retaining effect that prevents food from rolling off of the circular grill grate;
wherein cross-braces span perpendicularly underneath the lateral members before forming first, second, and third bends in order to form handles;
wherein the base further includes a ball bearing sandwiched between a grate bracket and a grill bracket; wherein the grate bracket attaches to the circular grill grate; wherein both the grate bracket and the circular grill grate can rotate with respect to the grill bracket;
wherein the grill bracket is secured atop the existing grill grate via securing means;
wherein the securing means includes a bolt having a shoulder that passes through a hole located in both the grate bracket and ball bearing before said shoulder rests atop a hole in the grill bracket before screwing onto a bar positioned under the existing grill grate such that the base is secured atop the existing grill grate; wherein the bar has a threaded hole for securing the bolt thereon;
wherein a cover plate having holes aligned with threaded holes located in the grate bracket is screwed thereto, and of which the circular grill grate is securely sandwiched between the cover plate and the grate bracket; wherein the cover plate has a hole for accessing or inserting the bolt therein;
wherein the bolt has a ring that rotates about a shoulder that folds up to aid in rotating said bolt or to fold flat when not in use;
wherein a cap fits atop the hole of the cover plate so as to block food or related debris from falling into said hole.

17. The rotating grill top accessory as described in claim 16 wherein the grill bracket has legs extending there under, which stabilizes the base atop the existing grill bracket.

18. The rotating grill top accessory as described in claim 16 wherein a cover plate having holes aligned with threaded holes located in the grate bracket is screwed thereto, and of which the circular grill grate is securely sandwiched between the cover plate and the grate bracket.

19. The rotating grill top accessory as described in claim 16 wherein the rotating grill top accessory has an overall height ranging from no less than 1 inch to no more than 5 inches.

20. The rotating grill top accessory as described in claim 19 wherein the circular grill grate has an overall shape comprising a circle, square, rectangle, triangle, or polygonal.

* * * * *